United States Patent [19]

Bösch

[11] Patent Number: 4,560,141

[45] Date of Patent: Dec. 24, 1985

[54] VACUUM GATE VALVE

[75] Inventor: Hubert Bösch, Lustenau, Austria

[73] Assignee: Siegfried Schertler, Haag, Switzerland

[21] Appl. No.: 734,755

[22] Filed: May 15, 1985

Related U.S. Application Data

[63] Continuation of Ser. No. 506,668, Jun. 22, 1983, abandoned.

[30] Foreign Application Priority Data

Jun. 30, 1982 [DE] Fed. Rep. of Germany ....... 3224387

[51] Int. Cl.⁴ ............................................. F16K 25/00
[52] U.S. Cl. .................................... 251/167; 251/169; 251/197; 251/204
[58] Field of Search ............... 251/167, 169, 197, 204; 137/630.12

[56] References Cited

U.S. PATENT DOCUMENTS 4,408,634 10/1983 Peacock ......................... 137/630.12

FOREIGN PATENT DOCUMENTS 448657 11/1966 Switzerland .

Primary Examiner—Harold W. Weakley
Attorney, Agent, or Firm—Toren, McGeady, Stanger, Goldberg & Kiel

[57] ABSTRACT

A vacuum gate valve includes a spreading mechanism with an actuating member extending between first and second valve plates and movable transversely of the axis of the valve, and parallelepiped spreading members disposed between the first valve plate and the actuating member and between the second valve plate and the actuating member. In the open position of the valve, the spreading members include an acute angle with the direction in which the actuating member is moved for closing the valve. When the actuating member is moved in order to spread apart the valve plates and to close the valve, the spreading members pivot about intersecting lines of contact surfaces formed in the valve plates and in the actuating member. In the closed position of the valve, the spreading members extend perpendicularly to the direction of the movement of the actuating member. The structural components of the spreading mechanism have linear contact with one another during operation, so that they move relative to one another practically without generating any friction. In addition, the spreading mechanism is capable of keeping the closed valve in the closed position without requiring external forces.

1 Claim, 10 Drawing Figures

VACUUM GATE VALVE

This is a continuation of application Ser. No. 506,668, filed June 22, 1983, now abandoned.

BACKGROUND OF THE INVENTION

The present invention relates generally to vacuum gate valves, and more particularly to a vacuum gate valve including a first valve plate movable perpendicularly to the valve axis and a second valve plate, and a spreading mechanism arranged between the valve plates for moving the valve plates between an open position and a closed position of the valve.

Vacuum gate valves with spreading mechanisms of various types are described, illustrated and explained in German Offenlegungsschrift No. 30 28 786. The spreading mechanisms illustrated in this case include surface areas which roll against one another when the valve is actuated, the rolling action sometimes taking place under high pressure. Since these surface areas are located in a vacuum and, therefore, are entirely without lubrication, these rolling movements lead to substantial wear. With increasing wear, the quality of the usually expensive valve is significantly reduced within a short period of time. The wear increases with increased specific surface pressures. When balls or spheres are used as rolling members, these specific surface pressures become very high.

Therefore, it is the primary object of the present invention to provide a gate valve of the above-described type, wherein the structural components of the spreading mechanism have linear contact with one another during their operation, so that they move relative to one another practically without generating any friction, and wherein the contact surfaces between the structural components of these mechanisms are as large as possible in the closed position of the valve, i.e., when the highest load is applied to the components.

Another object of the invention is to provide a gate valve wherein the spreading mechanism is capable of keeping the closed valve in the closed position without requiring external forces which might be subject to failure, such as, forces generated electrically, magnetically, hydraulically or pneumatically.

SUMMARY OF THE INVENTION

In accordance with the present invention, the vacuum gate valve includes a spreading mechanism comprising an actuating member extending between first and second valve plates and movable transversely of the axis of the valve, and parallelepiped spreading members disposed between the first valve plate and the actuating member and between the second plate and the actuating member. When the valve is in the open position, the spreading members of the spreading mechanism include an acute angle with the direction in which the actuating member is moved for closing the valve. The sides of the valve plates facing the actuating member and the sides of the actuating member facing the valve plates are provided with pairs of contact surfaces. The contact surfaces of each pair intersect one another and include an obtuse angle. Each narrow side of the spreading members as seen in the transverse cross-section thereof faces a pair of contact surfaces and is in contact with the intersecting line of the contact surface of that pair. When the actuating member is moved in order to spread apart the valve plates and to close the valve, the spreading members pivot about the intersecting lines of the contact surfaces from the position in which they include an acute angle with the direction of movement of the actuating member until they reach an essentially upright position in which they extend perpendicularly to the direction of movement of the actuating member.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
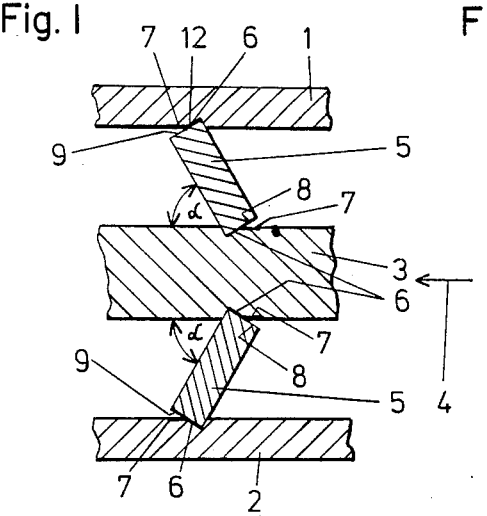
FIGS. 1 and 2 are sectional views showing details of the spreading mechanism in accordance with the present invention in two positions.
Figure 2:
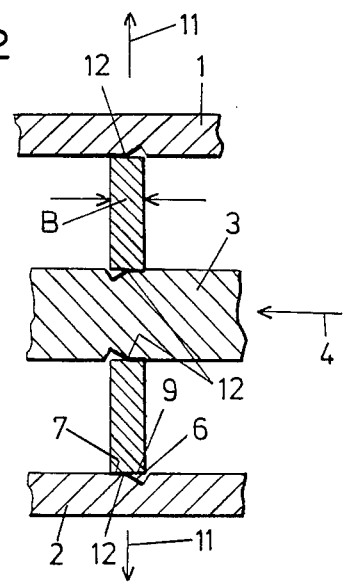

The principle of operation of the valve according to the present invention is illustrated in FIGS. 1 and 2. An actuating member 3, or a structural component to be moved by an actuating member, is disposed between a first valve plate 1 and a second valve plate 2. All structural components are schematically illustrated in order to explain as clearly as possible the principle of operation of the valve according to the present invention. The direction of movement of actuating member 3 is indicated by arrow 4, the direction of the arrow toward the left as viewed in the drawing corresponding to the movement of the actuating member 3 for closing the valve. Pairs of parallelepiped spreading members 5 are disposed between the structural components referred to above, i.e., first valve plate 1, actuating member 3 and second valve plate 2. The spreading members 5 may extend along the entire width of valve plate 1 or valve plate 2 in the direction perpendicular to the plane of the drawing, so that the parallelepiped spreading members 5 are illustrated in FIGS. 1 and 2 in the transverse cross-sections thereof.

When the valve is open and the spreading mechanism is in the position as illustrated in FIG. 1, the spreading members 5 include an acute angle α with the direction in which the actuating member 3 is moved in order to close the valve which direction is indicated by arrow 4. Contact surfaces 6 and 7 are provided for the spreading members 5 on the actuating member 3 and on the sides of the valve plates 1 and 2 facing the actuating member 3. Contact surfaces 6 and 7 intersect one another and include an obtuse angle with one another. The surfaces 6 and 7 are shown in the drawing in thicker lines as compared to the remaining lines for purposes of illustration only. When the valve is in the open position, contact surfaces 6 have contact with the short sides 8, 9 of the parallelepiped spreading members 5. Valve plates 1 and 2 and actuating member 3 are biased toward one another by means of pairs of leaf springs 10 which shall be described in more detail below.

When actuating member 3 is moved in order to close the valve, i.e., in the direction of arrow 4, valve plate 1 and valve plate 2 are displaced upwardly and downwardly, respectively, as illustrated by arrows 11 in FIG. 2. This is because a stop member, to be explained in more detail below, precludes valve plates 1 and 2 from moving in the direction of arrow 4. As a result, the spreading members 5 pivot about the intersecting lines 12 of the contact surfaces 6 and 7, thereby increasing the angle α and moving into an upright position until valve plate 1 makes contact with the valve seat in the valve housing, not illustrated in FIGS. 1 and 2.

It is advantageous when the contact surface 7 extends parallel to the direction of movement of actuating member 3 (arrow 4), so that when the closed position of the valve has been reached, the spreading members extend essentially perpendicularly to the valve plates and reach contact with the contact surfaces 7. This position is illustrated in FIG. 2, wherein the angle α has reached 90°. The size of the contact surface 7 and the width B of the narrow side 8 or 9 of the spreading member 5 are dimensioned in such a way that, in the position illustrated in FIG. 2, the contact surface 7 has contact with at least half of the narrow side 8 or 9 of spreading member 5. In this manner, the spreading mechanism reaches a stable equilibrium in this position, so that the valve remains in its closed position without the action of external forces on actuating member 3.

The relative movement between the structural components illustrated in FIGS. 1 and 2 takes place practically without any friction, because no sliding or rolling movement takes place between the opposing surfaces. Merely the narrow sides 8 and 9 of spreading members 5 pivot about the intersecting lines 12 of the contact surfaces.

Each spreading member 5 may be a single member extending along the width of the valve plates 1 or 2. In that case, the spreading member 5 is an elongated rod of rectangular cross-section. However, it is also possible to arrange a plurality of spreading members 5 of parallelepiped shaped next to one another either in the direction of movement of the actuating member 3 or transversely of this direction.

Figure 3:
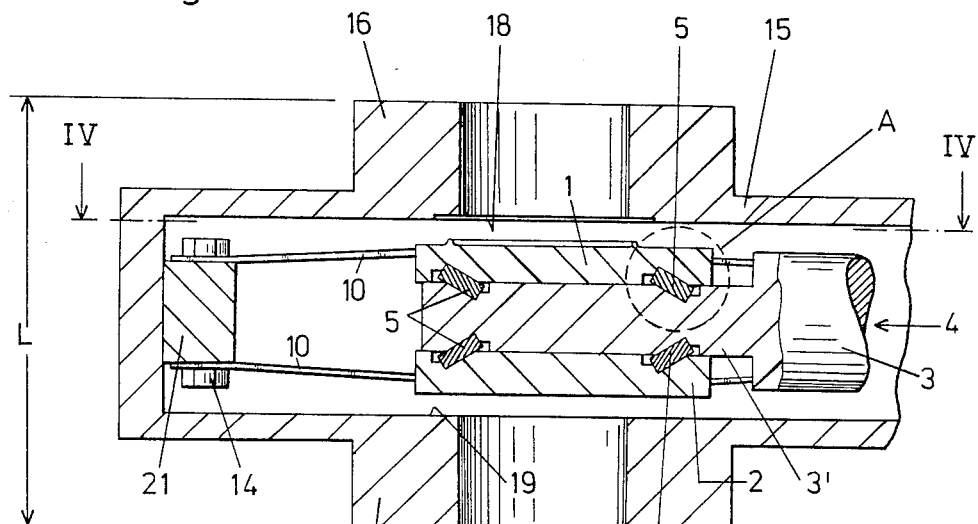
FIG. 3 is a sectional view of the vacuum gate valve according to the invention.
Figure 4:
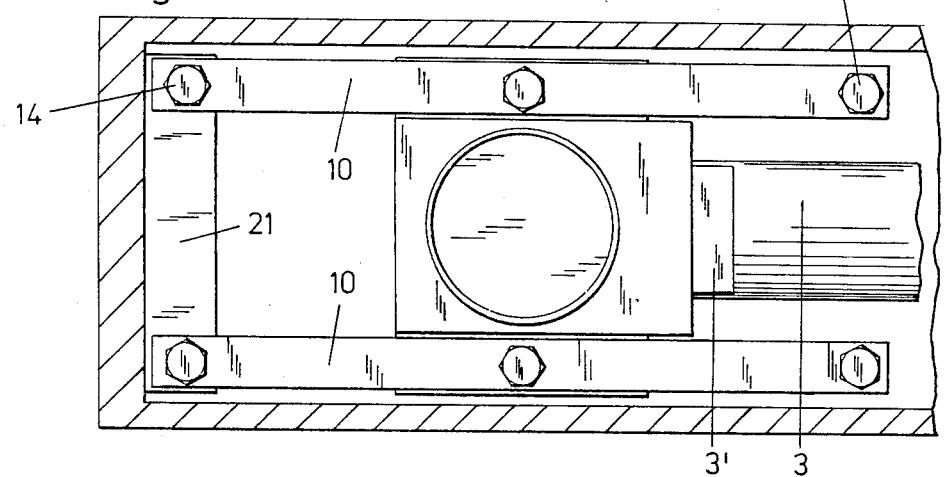
FIG. 4 is a sectional view of the valve taken along sectional line IV—IV of FIG. 3.

The principle of operation of the valve according to the present invention as described above is utilized in a vacuum gate valve shown in FIGS. 3 and 4. This gate valve has a valve housing 15 with two connecting flanges 16 and 17. The valve seat 18 for valve plate 1 is provided in flange 16, while flange 17 forms the contact surface 19 for valve plate 2. The end of actuating member 3 is flat and the flat portion 3' of the actuating member 3 extends between valve plate 1 and valve plate 2. Actuating member 3 can be moved axially in the direction of arrow 4. Further, it is advantageous when the actuating member 3 can be swung about an axis parallel to the valve axis, so that, as is the case in conventional valves of this type, valve plate 1 can be laterally swung out of the valve passage illustrated in FIG. 3. Valve plates 1 and 2 are elastically biased toward one another by means of pairs of leaf springs 10 which are arranged near the edges of plates 1 and 2. The ends of the pairs of leaf springs 10 on the left hand side in FIGS. 3 and 4 are connected to one another by means of a connecting member 21, the connecting member 21 serving as a stop for the movement of the valve plates in the direction of arrow 4. The ends of the leaf springs 10 of each pair are connected by means of screws 14 arranged laterally of the actuating member 3.

Figure 5:
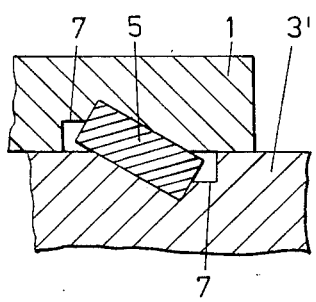
FIGS. 5 to 9 show a detail of the spreading mechanism according to the invention as encircled by circle A in FIG. 3, FIGS. 5 through 9 illustrating the movement of a spreading member of the spreading mechanism according to the invention from the open position of the valve to the closed position of the valve.
Figure 6:
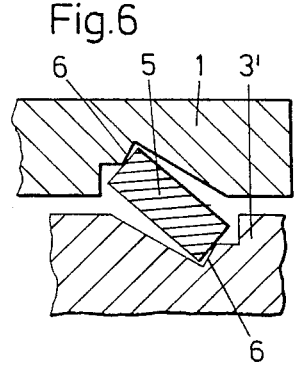
Figure 7:
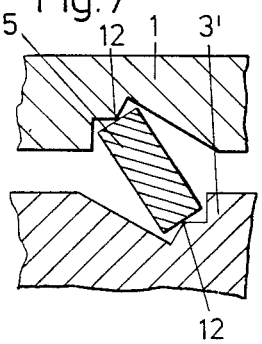
Figure 8:
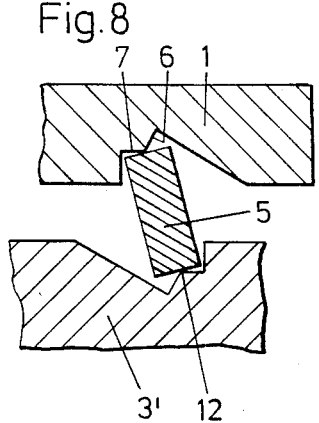

Recesses are formed in and extend across the sides of the valve plates 1 and 2 and the sides of the flat portion 3' of actuating member 3 which face one another. In these recesses there are received parallelepiped spreading members 5 which in the illustration of FIG. 3 are elongated bars of rectangular cross-section. A pair of spreading members 5 is arranged another pair between valve plate 1 and actuating member 3 and between valve plate 2 and actuating member 3. Contact surfaces extending at an angle relative to one another are formed in the recesses for receiving the spreading members. When the valve is in the open position as illustrated in FIGS. 3 and 5, the recesses define closed spaces in which these spreading members 5 are placed.

In the open position of the valve, the valve plates 1 and 2 are laterally swung by means of actuating member 3 out of the valve passage illustrated in FIG. 3. If the valve is to be closed, initially the valve plates are swung into the valve passage by means of the actuating member 3 and, subsequently, actuating member 3 is moved in the direction of arrow 4 until connecting member 21 makes contact with the valve housing. This position of the valve components is illustrated in FIG. 3. When the actuating member 3 is further moved in the direction of arrow 4, the spreading member 5 begins to act. This is because the movement of the actuating member 3 referred to has the effect that the parallelepiped spreading members 5 are gradually pivoted into an upright position. Individual steps of these movements are illustrated in FIGS. 5 through 9. The spreading members 5 pivot without friction about the intersecting line 12 of the contact surfaces 6 and 7 arranged at an angle relative to one another as illustrated in FIGS. 1 and 2. These components are dimensioned and arranged in such a configuration that the valve is tightly closed when the spreading member 5 have reached the upright position illustrated in FIG. 9. Since, as viewed in the direction 4 of moving the actuating member 3, the contact surface 7 in the stepped recess has at least the width of half the width of the narrow side 8 or 9 of the spreading member, the valve is locked in the closed position shown in FIG. 9 in such a way that no external forces are required for maintaining the closed position.

The parallelepiped spreading members 5 have hereinabove been described as being elongated bars of rectangular crosssection which extend over the width of the valve plates 1 and 2. It is also within the scope of the invention to use relatively short parallelepiped spreading members, in which case, for example, four of these spreading members can be arranged on each side of the flat portion 3' of actuating member 3, wherein the connecting lines of the spreading members form a polygon. Other arrangements and configurations of the spreading members with respect to position and number are possible. If the closed valve is to be opened, the actuating member is pulled outwardly against arrow 4. The spreading members pivot about the intersecting lines 12 into their initial positions and the sequence illustrated with the aid of FIGS. 5 through 9 is now reversed. In other words, when the actuating member 3 is pulled back, the spreading members 5 are moved from the position shown in FIG. 9 into the position illustrated in FIG. 5, the springs 10 return the valve plates into their original position as shown in FIG. 3 and the valve is now open. The valve plate 1 is still in the valve passage. Subsequently, the valve plate is moved out laterally by swinging the actuating member 3 about an axis which is parallel to the valve axis.

As illustrated in FIG. 3, actuating member 3 and flat portion 3' are constructed as a single piece. It is quite possible to provide two separately manufactured components which are then to be connected in a suitable manner. The actuating member 3 is driven by a conventional drive, such as, an electric, magnetic, pneumatic, or hydraulic drive. In the illustrated example, the valve plates 1 and 2 are shown as being relatively rigid components. It is quite possible to construct one or both of the valve plates, so that they are capable of compensating substantial variations in dimension. Elements to be used for this purpose in connection with the plates are spring rings or cup springs. Elements developed for this purpose to be used in vacuum valves are advantageous.

Figure 10:
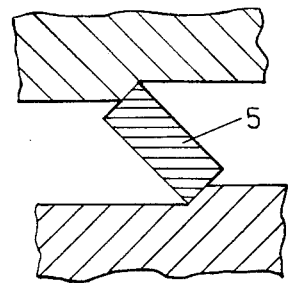
FIG. 10 is a sectional view, similar to FIGS. 5 to 9, but showing another embodiment of the spreading mechanism incorporating the present invention.

In the illustrated embodiment, the contact surfaces 6, 7 are provided in recesses of valve plates 1 and 2 and actuating member 3. It would also be possible to provide steps at the surfaces of these components, as it is schematically illustrated in FIG. 10. However, in the interest of obtaining a structural length L of the valve which is as short as possible, it is advantageous to provide the contact surfaces 6, 7 in recesses, so that when the valve is in the open position, as shown in FIGS. 3 and 5, these recesses form closed spaces in which the spreading members 5 are received in their entirety.

Figure 9:
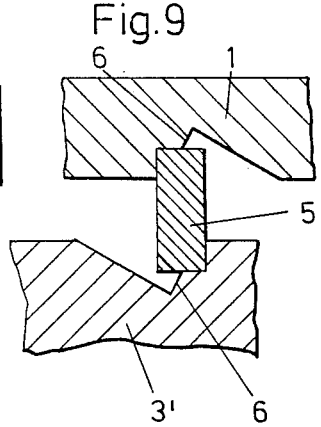

As explained above, the contact surface 7 which makes contact with the spreading member 5 when the valve is closed, extends parallel to the direction of movement 4 of the actuating member 3. It is also possible to slightly incline this contact surface 7 relative to the direction 4, so that the angle included between the two contact surfaces 6 and 7 becomes slightly smaller. In that case, when the valve is closed, the spreading member 5 first reaches the upright position as illustrated in FIG. 9 and then tilts beyond its dead center position slightly toward the right. As a result, an absolutely safe locking action of the valve is obtained, since the dead-center position of the spreading member has been passed and, therefore, a corresponding force application is required if the valve is to be opened and the spreading member 5 is to be tilted back past the dead-center position into the position illustrated in FIG. 8 and then into the positions illustrated in FIGS. 7, 6 and 5.

The greatest load is applied to the valve when it is in its closed position. This load results either from the closing pressure or from a differential pressure acting on the closed valve, or from a combination of these two pressures. In the case of a valve having an internal width of about 100 mm and constructed entirely of metal, the force acting on the valve plates and on the entire spreading mechanism is about 10,000 N. During the application of these huge forces, the spreading members 5 rest on the contact surfaces 7, i.e, on a large surface area. On the other hand, during the closing and opening of the valve, only those forces act on the components referred to above which are produced by the leaf springs 10. These forces are about 800 N. It is only during this relatively low load application that the contact between the spreading members 5 and the valve plates 1 and 2 and the actuating member 3 is linear. This clearly demonstrates the extraordinary advantage of the valve according to the present invention over the valves known in the past. In addition, the spreading mechanism in accordance with the present invention provides an especially favorable ratio of closing force relative to sealing force at the valve. Compared to known spreading mechanism, this ratio is about twice as great, so that high closing pressures can be obtained by means of small actuating forces and, consequently, the structural size of the actuating mechanism of the valve may be relatively small.

While specific embodiments of the invention have been shown and described in detail to illustrate the application of the inventive principles, it will be understood that the invention may be embodied otherwise without departing from such principles.

I claim:

1. A vacuum gate valve including first means forming a valve seat (18) encircling an opening with a valve axis extending centrally through the opening, a first valve plate (1) and a second valve plate (2) each having a first surface facing a first surface on the other and an oppositely directed second surface with said first and second surfaces extending transversely of the valve axis, second means located between the first surfaces of said first and second plates for displacing the first surfaces so that they move toward and away from one another and when they are moved away from one another the second surface of said first plate is pressed into sealing contact with said valve seat for placing said valve in the closed condition, and when they are moved toward one another said valve is in the open condition, said second means includes an actuating member (3) arranged for movement transversely of the axial direction of the valve axis for effecting the displacement of said first and second plates in the direction of the valve axis, said second means includes rectangularly shaped spreading members (5) elongated in one direction as compared to the other each having a pair of spaced parallel long sides and a pair of spaced parallel short sides extending between the opposite ends of said long sides and where said long sides are significantly longer than said short sides, some of said spreading members being pivotally supported in contact with said actuating member and the first surface of said first plate and the others being pivotally supported in contact with said actuating member and the first surface of said second plate, said actuating member having a pair of oppositely facing third surfaces with each said third surface facing a different one of said first surfaces on said first and second valve plates, each of said first surfaces and third surfaces having a first contact surface (6) and a second contact surface (7) contiguous to said first contact surface and said first and second contact surfaces extending angularly relative to one another at an angle greater than a straight angle, the intersection of said first and second surfaces forming a rectilinear line of intersection (12), and said first and second contact surfaces in each said first surface being located opposite said first and second contact surfaces in the opposite third surface of said actuating member, said long sides of said spreading members extend between said first surfaces on one of said first and second valve plates and said third surfaces on said actuating member in the open condition and in the closed condition of said valve, said short sides (8,9) of said spreading members contact said first contact surfaces (6) in the open condition of said valve and extend obliquely of the valve axis and contact said second contact surfaces (7) in the closed condition of said valve and extend substantially perpendicular to the valve axis, and during the movement of said first valve plate (1) between the closed and open conditions of said valve a line extending across each of said short sides of said spreading members (5) is disposed in contact with and pivots about the corresponding intersecting line (12) between said first and second contact surfaces (6,7) out of contact with said first and second contact surface and pivots between the open condition of said valve when said long sides of said spreading members (5) form an acute angle with the first surfaces of said first and second valve plates and the third surfaces of said actuating member and the closed condition of said valve when the long sides of said spreading members extend substantially perpendicularly to the first surface of said first and second valve plates and the third surface of said actuating member, and in the closed condition said second contact surfaces (7) support at least half of the width of said short sides (8,9).

* * * * *